Figure 1:
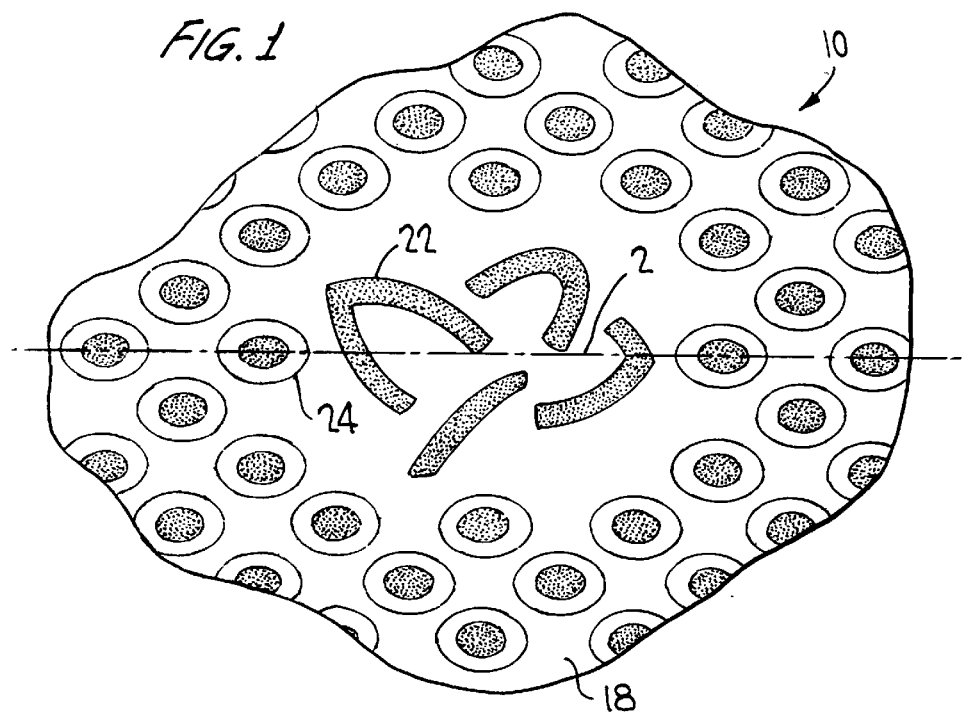

United States Patent [19]
Graff

[11] Patent Number: 5,840,404
[45] Date of Patent: Nov. 24, 1998

[54] ABSORBENT MULTILAYER SHEET AND METHOD FOR MAKING SAME

[75] Inventor: Pierre Graff, Wolfgantzen, France

[73] Assignee: Fort James France, Kunheim, France

[21] Appl. No.: 817,594

[22] PCT Filed: Aug. 13, 1986

[86] PCT No.: PCT/FR96/01281
§ 371 Date: Apr. 23, 1997
§ 102(e) Date: Apr. 23, 1997

[87] PCT Pub. No.: WO97/08386
PCT Pub. Date: Mar. 6, 1997

[30] Foreign Application Priority Data

Aug. 25, 1995 [FR] France .................................. 95 10096

[51] Int. Cl.[6] .............. B32B 3/00; B32B 31/00; D21H 11/00
[52] U.S. Cl. .......................... 428/154; 428/178; 428/535; 156/209; 156/290; 156/291; 156/292; 162/109
[58] Field of Search ...................... 428/174, 154, 428/191, 534, 535, 178; 156/290, 291, 292, 209, 308.4; 162/109

[56] References Cited
U.S. PATENT DOCUMENTS 4,326,002  4/1982  Schulz ...................................... 428/178
5,382,464  1/1995  Ruppel et al. .......................... 428/166

Primary Examiner—Donald Loney
Attorney, Agent, or Firm—Breiner & Breiner

[57] ABSTRACT

The invention concerns an absorbing multi-layer web (10) of at least two layers (12, 14) each including at least one embossed ply (16, 18, 20) made of a creped absorbent paper, having an outer side forming the outer side of the multi-layer web and an inner side, the inner side of the first layer (12) including first and second protrusions (22) and (24) respectively, and the inner side of the second layer (14) including third protrusions (26) nesting between the protrusions (22, 24) of the first layer, the two layers (12, 14) being bonded to each other, characterized in that the first layer (12) is a double ply including of an inner ply (16) of which the inner side includes first and second protrusions (22A) and (24A) respectively, and an outer ply (18) of which the inner side includes first protrusions (22B) and second protrusion (24B). The tops of the protrusions (22A) and (22B) are bonded to each other but not the tops of the protrusions (24A) and (24B).

13 Claims, 3 Drawing Sheets

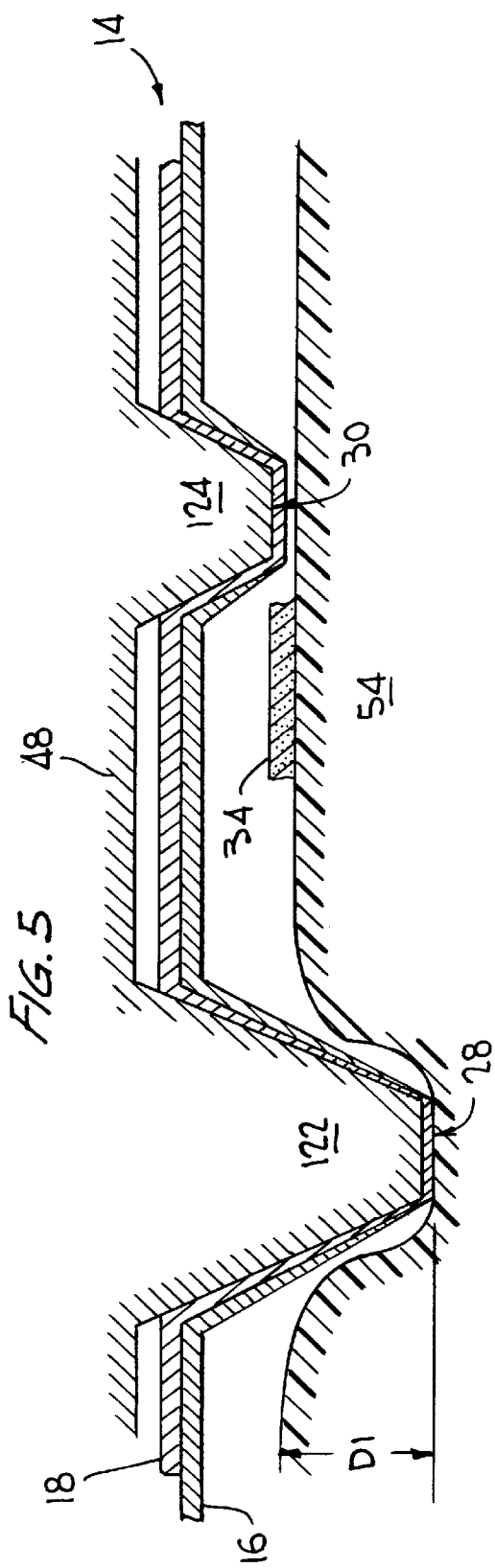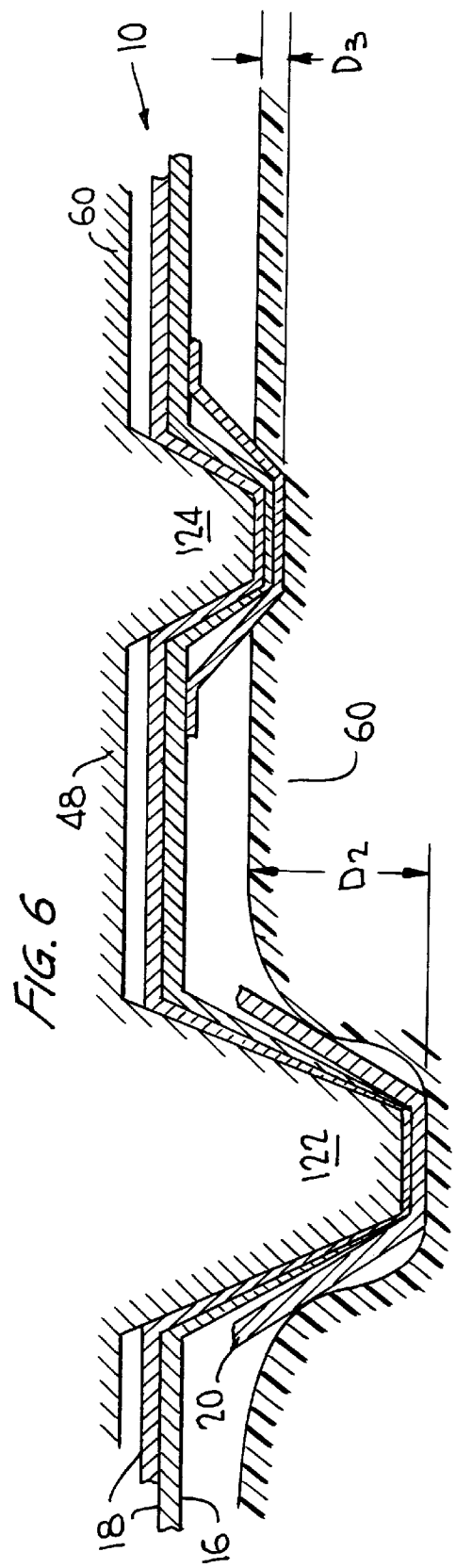

ABSORBENT MULTILAYER SHEET AND METHOD FOR MAKING SAME

The present invention concerns absorbent papers for household and sanitary uses.

In particular, the invention relates to a multi-layer sheet, i.e., a multi-layer web, for such products as toilet paper, napkins or paper towels, as well as to a manufacturing method for such multi-layer webs.

Use is made in the sanitary and household paper industry of creped absorbent paper of low weight, such as cellulose wadding or tissue paper, for making various products.

Such materials being stretchable on account of creping, are also subject to embossing.

Embossing imparts bulk to the web and improves touch, softness and liquid absorption.

Attempts have been made to increase absorptivity by creating multi-layer webs by combining two or more sheets, also called plies.

Illustratively, U.S. Pat. No. 3,867,225 describes a procedure for making such a product by separately embossing two plies of cellulose wadding into a pattern of protrusions present at a rate of 2 to 30/cm$^2$, by applying an adhesive to the tops of some of these protrusions, by bringing the plies near one another with their embossed sides facing each other, by nesting the protrusions of one ply between those of the other, and by adhesively bonding the tops of one ply to the cavities of the other.

The empty spaces between the two plies thereby result in a multi-ply structure having increased absorptivity relative to absorbing webs not so designed.

As regards some product applications, where softness is critical, an excessive number of bonding points between the two plies is to be avoided because the total bonded area subtended by such an excessive number substantially contributes to stiffness.

Adhesive deposition is implemented by an adhesive-depositing cylinder and the number of bonding points equals that of the web protrusions receiving glue.

In order to lower the number of bonding points, U.S. Pat. No. 3,867,225 suggests partial glue deposition using an adhesive-depositing cylinder of which the surface is hollowed by alveoles.

However, such a design solution was found to present difficulties in practice on an industrial scale due to rapid cylinder soiling by material accumulation in the alveoles.

U.S. Pat. No. 4,320,162 describes a multi-layer web structure constituted of two embossed plies. Each ply has a wide pattern of first protrusions which are embossed in a relatively deep manner and which are enclosed by a more compact pattern of second protrusions which are embossed more shallowly.

In a first embodiment, the two plies are combined by means of the tops of the first protrusions and in a second embodiment by means of the tops of the first protrusions for one ply and by the tops of the second protrusions for the other ply.

Theoretically such a structure offers more inner empty space than in the design disclosed in U.S. Pat. No. 3,867,225 because the two plies are united by the tops of the protrusions.

However, a web having such a structure will be degraded in its crush resistance.

Even at slight pressures, sagging of the protrusions is observed.

In order to combine the advantages offered by the two above cited procedures while at the same time being free of their drawbacks, French Patent No. 94 07482 already has proposed an absorbent multi-layer web of at least two layers each composed of at least one embossed ply of creped absorbent paper with a specific surface weight between 10 and 40 g/m$^2$ per ply and having an outer side forming the outside of the multi-layer web and an inner side, where the inner side of the first layer comprises first and second protrusions and the inner side of the second layer comprises third protrusions nested between the protrusions of the first layer, the two layers being bonded to each other at least by a portion of the protrusion tops of the first layer which are glued to the second layer between two third protrusions.

This multi-layer web is characterized in that the adhesive bonding is ensured by the first protrusion tops of the first layer, the second protrusions of the first layer being of a height less than that of the first protrusion and their tops being free of adhesive.

Thanks to such a design, layer crush resistance is undegraded and its stiffness is less than that of a web comprising the same number of nesting protrusions all of the same height.

The object of the present invention is a web of a design similar to that described above which retains the physical features while, however, imparting to the user the perception of greater thickness and greater strength.

For that purpose, the invention proposes an absorbing multi-layer web of at least two layers each made up of at least one embossed ply of creped absorbent paper having a specific surface weight between 10 and 40 g/m$^2$ for each ply, having an outer side forming the outside surface of the multi-layer web and an inner side where the inner side of the first layer comprises first and second protrusions and the inner side of the second layer comprises third protrusions nesting between the first layer protrusions, the two layers being mutually bonded by at least part of the protrusion tops of the first layer being solidly affixed in an adhesive manner to the second layer between two third protrusions, the multi-layer web being characterized in that the first layer is a double ply composed of:

an inner ply of which the inner side comprises the first and second protrusions, an outer ply of which the inner side comprises first protrusions coinciding with the first protrusions of the inner ply, the outer ply further comprising second protrusions coinciding with the second protrusions of the inner ply, and in that the bonding between the layers is assured adhesively between the first protrusion tops of the first layer and the second protrusion tops of the inner ply of the first layer, and in that the first protrusion tops of the inner and outer plies of the first layer are adhesively bonded.

Regarding other features of the invention:

the height of the second protrusions of the outer ply is at least 50 % of the height of the first protrusions, the first protrusions are arrayed in a spaced pattern, more than one second protrusion being situated between two consecutive first protrusions, the area of the first protrusions fitted with adhesive is between 0.1 and 20 % of the ply surface, said adhesive-fitted area is between 1 and 5 % of the total ply surface, the adhesive-fitted area of the second protrusion tops of the inner ply of the first layer is between 0.1 and 20 % of the total ply surface, the height of the third protrusions is less than or equal to the height of the first protrusions, the second layer comprises fourth protrusions having a height at least 50 % the height of the third protrusions, the tops of the third protrusions are adhesively bonded to the first layer.

Another object of the invention is a method for making a multi-layer web of the invention that is characterized by:

embossing the inner ply of the first layer to form the first and second protrusions, embossing the outer ply of the first layer to form therein the first and second protrusions, joining the inner and outer plies to constitute the first double ply layer, embossing the ply of the second layer in order to implement therein at least the third protrusions, depositing adhesive on at least a portion of the tops of the first and second protrusions of the inner ply of the first layer, bringing the double ply of the first layer near the ply of the second layer in such a manner that the first and second protrusions of the double ply will nest between the third protrusions of the second layer so that the adhesive-fitted tops of the first protrusions of the inner ply of the first layer shall adhere to the first protrusion tops of the outer ply of the first layer and to the ply of the second layer between two third protrusions and in a way such that the adhesive-fitted second protrusion tops of the inner ply of the first layer shall adhere only to the ply of the second layer between two third protrusions.

The method evinces further features, namely:

the inner and the outer plies of the first layer are simultaneously embossed on a first cylinder comprising at its surface first and second salient elements, and the tops of the first and second protrusions of the inner ply of the first layer are simultaneously fitted with adhesive by a glue depositing roller cooperating with the first cylinder bearing the embossed double ply, the method involving embossing the second layer ply on a second cylinder comprising at least third salient elements, the adhesive bonding between the two layers is ensured using a so-called joining roller cooperating with the first cylinder bearing the embossed double ply nesting with the embossed ply of the second layer.

Other features and advantages of the invention are elucidated in the detailed description below and illustrated in the attached drawings.

Figure 2:
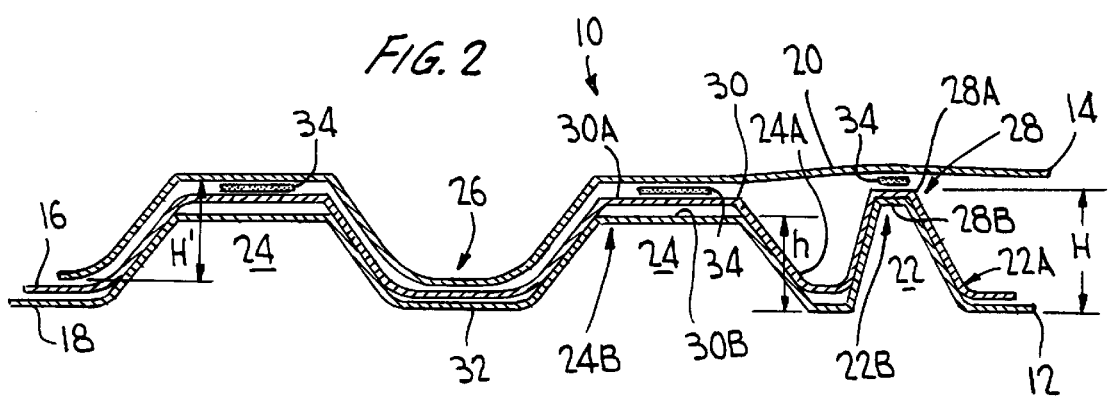
Figure 4:
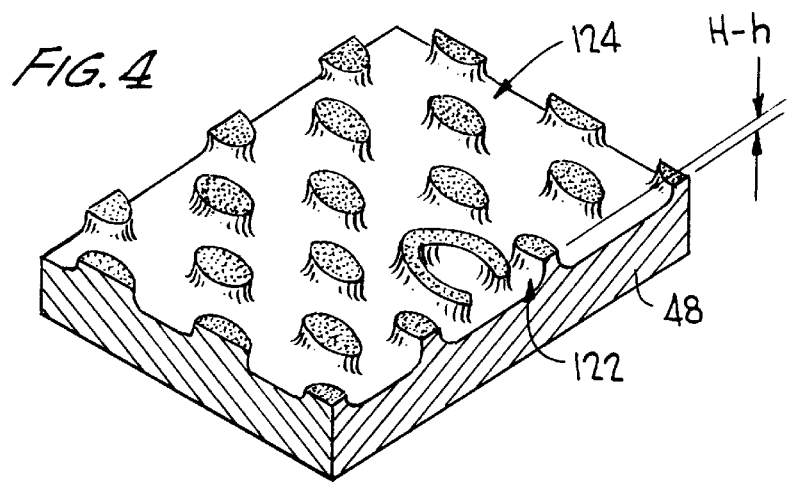
Figure 3:
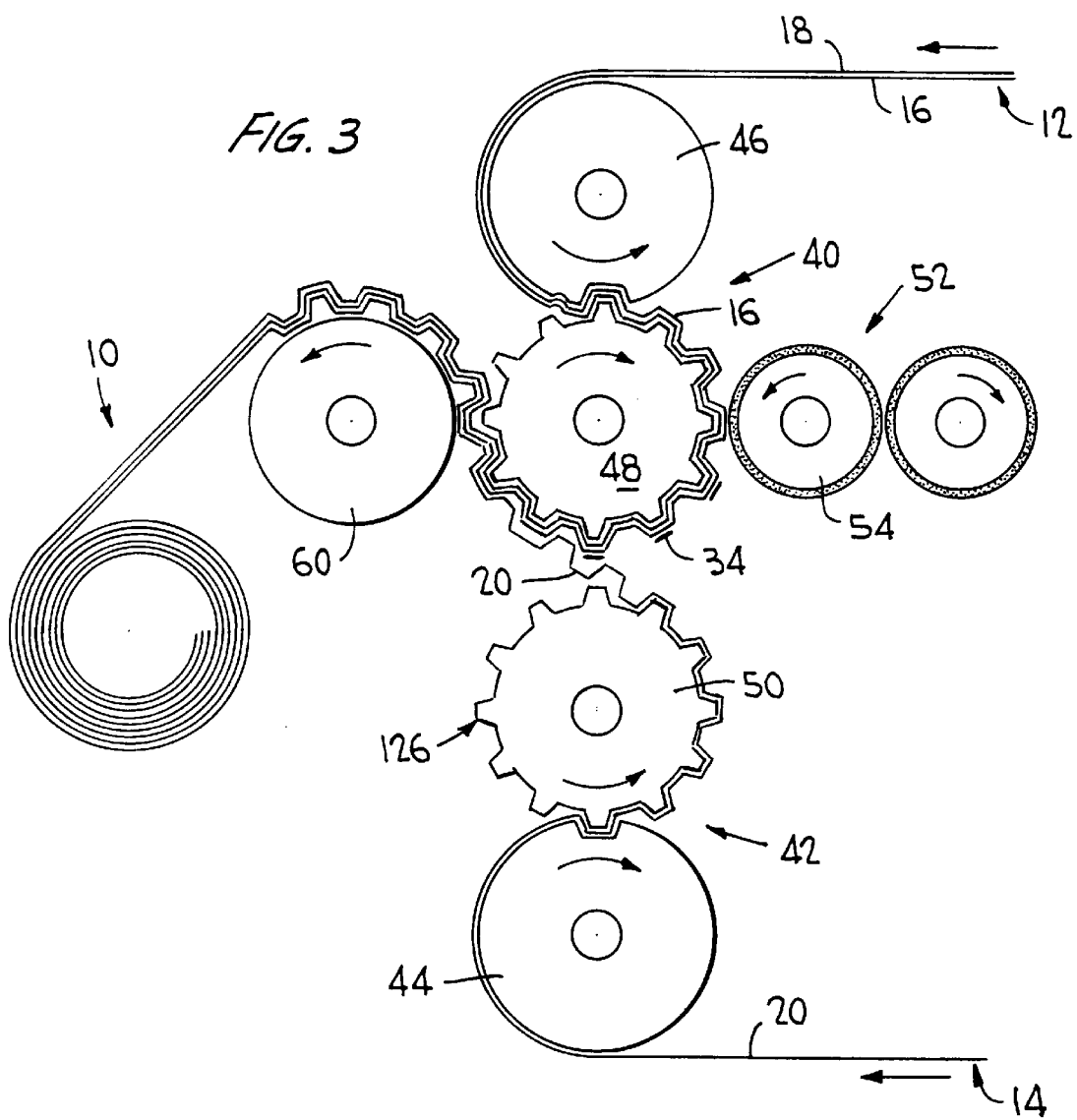

FIG. 1 is a partial diagrammatic view on a large scale seen from the outer side of the second layer of a multi-layer web of the invention, FIG. 2 is a partial sectional view along line 2—2 of FIG. 1, FIG. 3 is a schematic view of apparatus implementing the manufacturing method of the invention, FIG. 4 is a perspective detailed view illustrating the pattern of salient elements on one of the embossing cylinders of the apparatus of FIG. 3, FIG. 5 is a schematic sectional view in an axial plane illustrating the cooperation of the cylinder embossing the plies of the first layer with the glue depositing roller, and FIG. 6 is a view similar to that of FIG. 5 showing the cooperation of the cylinder bearing the double ply of the first layer and the second layer ply with a joining roller.

FIGS. 1 and 2 show a multi-layer web 10 composed of a first layer 12 and a second layer 14.

The first layer 12 comprises a first inner ply 16 and a second outer ply 18 whereas the second layer comprises a single ply 20.

Each of the plies 16, 18 and 20 is a ply of absorbent, creped cellulose-wadding or tissue paper used as household or sanitary paper having a specific surface weight of between 10 and 40 g/m$^2$.

The inner ply 16 constitutes the inner side of the first layer 12 facing the inner side of the single ply 20 of the second layer 14, whereas the outer ply 18 of the first layer 12 constitutes the outer side of this first layer.

As shown in FIGS. 1 and 2, the two plies 16 and 18 of the first layer 12 are embossed with the same pattern of protrusions, this pattern comprising first protrusions 22 and second protrusions 24 projecting inside the multi-layer web 10, that is between the two layers 12 and 14. The protrusions 22A of the ply 16 coincide with the protrusions 22B of the ply 18. Similarly, the protrusions 24A of the ply 16 coincide with the protrusions 24B of the ply 18.

The shape of the first protrusions 22 may be arbitrary.

Advantageously such shapes shall be designed to form the impression of a linear drawing, for example, a flower as shown in FIG. 1.

The first protrusions 22, and hence the impressions of the flowers, are comparatively well spaced apart.

Such spacing in particular depends on the area occupied by the design on the ply.

Illustratively, for a design within an area of 100 mm$^2$, the distance between two such flower designs will be roughly 15 mm.

The height H, also called the depth, of the first protrusions 22 is between 1 and 2 mm.

A particularly appropriate value of H when making a cellulose-wadding toilet paper with a specific surface weight of between 10 and 40 g/m$^2$ is between 1.2 and 1.5 mm, for example 1.3 mm.

The second protrusions 24, assuming a butte shape, are present between the comparatively mutually distant first protrusions 22.

These second structural elements of the multi-layer web 10 must serve, as do the first elements 22, as braces to oppose compressing of the web 10 and to provide bulk.

The second elements are very numerous and spread around the first elements 22 in a much denser pattern.

According to the disclosure of the invention, and as shown in FIG. 2, the protrusions 22B perfectly coincide with the protrusions 22A. They evince the same height H and are mutually bonded by their tops 28B and 28A.

On the other hand, and even though coinciding, the protrusions 24B and 24A are much less in contact because their tops 30A and 30B are not bonded.

The second protrusions 24 evince a height h less than the height H common to the first protrusions 22A, 22B.

The first and second protrusions 22 and 24, respectively, of the first layer 12 nest between third protrusions 26 embossed into the ply 20 of the second layer 14.

Illustratively, the third protrusions 26 evince a shape and a density equivalent to those of the second protrusions 24.

In the embodiment shown in FIG. 2, the height H' of the third protrusions 26 is slightly less than the height H in order that the tops 28A of the first protrusions 22A and the tops 30A of the second protrusions 24A of the ply 16 make contact with the inner side of the second layer ply 20, whereas tops 32 of the third protrusions 26 make contact with those portions opposite the inner ply of the inner side 16 of the first layer 14 that are located between the adjacent first and/or second protrusions.

The first layer 12 and the second layer 14 are mutually bonded adhesively in the embodiment shown in FIG. 2.

For that purpose, adhesive 34 was applied in the manner elucidated further below to the tops 28 and 30 and, as a result, the adhesive bonds the tops of the first protrusions 22A and the second protrusions 24A of the inner ply 16 to the ply 20 of the second layer.

The adhesive 34 deposited on the tops 28A, diffusing through the ply 16, also adhesively bond to each other the tops 28A and 28B of the first protrusions 22A and 22B to thereby complete the bonding between the inner and outer plies 16 and 18, respectively, of the first layer 12, such bonding moreover being also ensured on account of their simultaneous embossing as will be explained below.

For graphical clarity, FIG. 2 shows play between the tops 28 and 30 and the inner side of the ply 20 of the second layer 14.

Thanks to the invention's design of the multi-layer web 10, the web evinces adequate strength and keeping properties, with stiffness being enhanced because of the adhesive 34 being present on the tops of the first and second protrusions, while nevertheless the user experiences the high softness of the outer ply 18.

Obviously as well, the multi-layer web 10 retains the advantages of an embossed multi-layer web offering the feel of substantial thickness to the user.

FIGS. 2 through 6 relate to a manufacturing method for the multi-layer web 10.

FIG. 3 schematically shows a design of overall conventional equipment with which to carry out the method of the invention to make a multi-layer web 10 also of the invention.

This equipment comprises two embossing units 40 and 42 each consisting of an elastomer-clad cylinder 44, 46, respectively, and cooperating with an engraved steel cylinder 48, 50 respectively.

The cylinders 48 and 50 are engraved in such a manner that they evince salient elements at the surface and/or buttes spread both in the circumferential, that is machine-advance direction, and in the transverse direction, i.e., along the cylinder width.

The two plies 16 and 18 which shall constitute the first layer 12 are pulled from spools, not shown, and are guided around the cylinder 46.

The cylinder 46 is pressed against the cylinder 48 by appropriate, not shown, means in such a manner that the plies 16 and 18 moving between the cylinders are made to deform and to follow the engraving topology of the cylinder 48 shown in FIG. 4.

The plies 16 and 18 are embossed while passing between the rollers 46 and 48 driven by the latter.

A known adhesive depositing apparatus 52 by means of a depositing cylinder 54 deposits an adhesive 34 onto the tops 28A and 30A of the protrusions 22A and 24A of the inner ply 16.

The first protrusions 22A and 22B are simultaneously engraved by salient elements 122 of the cylinder 48 whereas the second protrusions 24A and 24B are simultaneously engraved by corresponding second salient elements 124 of the cylinder 48.

After having passed between the two rollers 46 and 48, the simultaneously embossed second protrusions 24A and 24B evince the same reduced height h which is less than the height H of both simultaneously manufactured first protrusions 22A and 22B.

As shown in detail in FIG. 4, the tops of the salients 124 are higher than the tops of the salients 122, the height difference between these tops being H-h.

When the salient elements 122, 124 are made by engraving or by milling, the height is measured from the substantially plane top of the salient element to the bottom of the engraving.

If the elements are added, the height-differential procedure is the same, the reference top being the highest one.

The ply 20 of the second layer 14, which is drawn from a spool not shown, undergoes similar embossing by passing between the cylinders 44 and 50.

The surface of the cylinder 50 comprises third salient elements 126 to emboss third protrusions 26 into the ply 20.

Thereupon, the ply 20 lifts off the surface of the cylinder 50 and comes into contact with the inner ply 16 of the first layer 12 over part of the layer's advance wherein the ply remains still pressed against the surface of the engraved cylinder 48.

The two cylinders 48 and 50 are driven at synchronous and opposite speeds and are keyed in relative rotation in such a manner that the protrusions 26 of the ply 20 will nest between the protrusions 22 and 24 of the first layer 12.

A so-called joining cylinder 60 having a smooth surface and driven in rotation against the cylinder 48 ensures joining of the two layers of the web 10 by pressing the ply 20 against the tops 28, 30, clad with adhesive 34, of the protrusions of the first double ply layer 12.

The multi-layer web 10 so made is then cut into small-size sheets and formed into rolls, for example, of toilet paper.

Practically, the height h of the second salient elements 124 shall be at least 0.05 mm less than the height H of the first salient elements 122 but, preferably, height h shall remain more than half of H as given by the relation $0.5 \times H < h < H - 0.05$.

The height H' of the salient elements 126 of the cylinder 50 is equal to or less than the height H of the first elements 122 of the cylinder 48.

If the height H' was larger, the third protrusions 26 formed in the paper would be crushed and brought down to the height H when passing through the gap between the joining cylinder 60 and the engraved cylinder 48.

The salient elements 126 of the engraved cylinder 50, illustratively, are distributed exactly as the second elements 122 of the first engraved cylinder 48.

In this manner, zones which are not salient will remain and receive the nesting, salient first elements 122.

As regards FIGS. 5 and 6, the deposition of the adhesive 34 by means of the roller 54 and the joining of the two layers by the joining cylinder 60 will now be discussed in greater detail.

As shown in FIG. 5, the adhesive coat 34 covering the cylindrical surface of the roller 54 is deposited on account of the height differential H-h between the tops of the first salient elements 122 and the second salient elements 124 of the engraved cylinder 48 onto the tops 28 and 30, the elastomer-clad roller 54 applying different pressures on these tops.

The deflection D1 of the elastomer of the roller 54 is much larger at the level of the first salient elements 122 and as a result the adhesive 34 will be made to cross, and thereby impregnate the tops of the first protrusions 22A of the inner ply 16, and to cross the paper of this ply to impregnate the tops of the first protrusions 22B of the outer ply 18.

Uniform adhesive deposition on all tops 30 also depends on the material hardness of the depositing roller 54, on its thickness and on material quality.

In similar manner and as shown in FIG. 6, the material constituting the joining cylinder 60 undergoes a deflection D2 which is much larger at the level of the first salient elements 122 than the deflection D3 which it undergoes at the level of the second salient elements 124.

Because of the very high pressure applied by the joining cylinder 60 at the level of the first salient elements 122, the three plies remain linked and bonded together at the level of the first protrusions 22.

On the other hand, because of the lesser pressure applied by the joining cylinder at the level of the second salient elements 124, only the tops 30A of the second protrusions 24A of the inner ply 16 are bonded to the opposite elements of the ply 20. No adhesive bonding takes place between the tops 30B of the second protrusions 24B of the outer ply 18 and the tops 30A.

Accordingly, as soon as the paper leaves the zone within which the joining cylinder 60 and the engraved cylinder 48 are cooperating, the multi-layer web 10 evinces the structure shown in FIG. 2 of the invention.

Therefore, the method of the invention makes it possible, while using conventional equipment but appropriately selecting the materials constituting the depositing cylinder 54 and the joining cylinder 60, further by employing accurate settings of axis-to-axis distances between the various rollers and cylinders, to manufacture a web evincing the structure of the invention as illustrated in FIG. 2.

However, the invention is not restricted to webs made by this one implementing method.

Illustratively, the three plies may be each engraved separately using a set combining an engraving cylinder and a compression cylinder, in which case the three plies then will evince the contours shown in FIG. 2, the three plies then being mutually bonded by adhesive operations resulting in the structure of the multi-layer web 10.

Nor is the invention restricted to the embodiment wherein the ply 20 of the second layer 14 comprises only third protrusions.

The cylinder 50 may comprise third and fourth (not shown) salient elements which, following embossing of the ply 20 evince third and fourth protrusions at the surface of the ply.

The heights H' and h' of the third and fourth salient elements, preferably, are related by the same functional relationship as H and h.

Moreover, the second layer 20 also may be a double ply.

I claim:

1. An absorbing multi-layer web comprising at least two layers with each layer being constituted of at least one ply of absorbent paper having a specific surface weight of between 10 and 40 g/m² per ply, an outer side of one layer forming an outer side of the multi-layer web and an inner side, an inner side of a first layer of said at least two layers including first and second protrusions and an inner side of a second layer of said at least two layers including third protrusions structured to nest between said first and second protrusions of the first layer, the first layer and the second layer being bonded to each other at least a portion of tops of the first and second protrusions of the first layer and joined to the second layer between two of the third protrusions, wherein the first layer is a double ply and includes an inner ply having an inner side containing first and second protrusions, and an outer ply having an inner side containing first protrusions coinciding with the first protrusions of the inner ply and said outer ply further containing second protrusions coinciding with the second protrusions of the inner ply;

and wherein bonding between said first layer and said second layer is by adhesive present between at least a portion of tops of the first protrusions of the inner ply of the first layer and the second protrusions of the inner ply of the first layer, and wherein the tops of the first protrusions of the inner ply and the first protrusions of the outer ply are bonded adhesively.

2. Web as claimed in claim 1 wherein height (h) of the second protrusions of the outer ply is at least 50 % of height (H) of the first protrusions of the inner ply and the first protrusions of the outer ply.

3. Web as claimed in either of claims 1 or 2 wherein the first protrusions of the first layer are distributed in a spaced pattern with more than one second protrusion of the first layer being located between two consecutive first protrusions.

4. Web as claimed in claim 1 wherein adhesive-containing areas on the tops of the first protrusions of the inner ply amount to between 0.1 and 20% of one surface of the web.

5. Web as claimed in claim 4 wherein said adhesive-containing areas amount to between 1 and 5% of total surface of the web.

6. Web as claimed in claim 1 wherein adhesive-containing areas on the tops of the second protrusions of the inner ply of the first layer amount to 0.1 to 20 % of total surface of the web.

7. Web as claimed in claim 1 wherein height (H') of the third protrusions is at most equal to height (H) of the first protrusions of said first layer.

8. Web as claimed in claim 7 wherein the second layer further includes fourth protrusions of a height (h') which is at least 50% of height (H') of the third protrusions.

9. Web as claimed in either of claims 7 or 8 wherein tops of the third protrusions by means of adhesive present on at least a portion of the tops form an adhesive bond with the first layer.

10. A method for manufacturing a web as claimed in claim 1 comprising:

embossing the inner ply of the first layer to produce therein the first and second protrusions, embossing the outer ply of the first layer to produce therein the first and second protrusions, assembling the inner ply and the outer ply to constitute the first layer, embossing the ply of the second layer to produce therein at least said third protrusions, depositing adhesive on at least a portion of tops of the first and second protrusions of the inner ply of the first layer, bringing the double ply of the first layer near the ply of the second layer in such a manner that the first protrusions and the second protrusions of the first layer nest between the third protrusions of the second layer in such a way that the tops with adhesive thereon of the first protrusions of the inner ply of the first layer adhere to tops of the first protrusions of the outer ply of the first layer and to the ply of the second layer between two third protrusions and in such a way that the tops containing adhesive of the second protrusions of the inner ply of the first layer adhere only to the ply of the second layer between two third protrusions.

11. Method as claimed in claim 10 wherein the inner ply and the outer ply of the first layer are simultaneously embossed on a first engraved cylinder which comprises a surface containing first salient elements and second salient elements, the second salient elements having a height less than that of the first salient elements, and wherein the tops of the first protrusions and the second protrusions of the inner ply of the first layer are simultaneously fitted with adhesive by a common roller applying adhesive and which cooperates with the first engraved cylinder bearing the embossed inner ply and embossed outer ply.

12. Method as claimed in claim 11 further comprising embossing the ply of the second layer on a second engraved cylinder having a surface with at least third salient elements.

13. Method as claimed in either of claim 11 or 12 wherein adhesive bonding of the first layer and the second layer to each other is by a joining roller which cooperates with the first engraved cylinder bearing nesting embossed inner ply and embossed outer ply and embossed ply of the second layer.

* * * * *